(12) United States Patent
Kawakami et al.

(10) Patent No.: US 10,924,780 B2
(45) Date of Patent: Feb. 16, 2021

(54) SERVER AND PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 16/609,025

(22) PCT Filed: Dec. 5, 2018

(86) PCT No.: PCT/JP2018/044665
§ 371 (c)(1),
(2) Date: Oct. 28, 2019

(87) PCT Pub. No.: WO2019/111925
PCT Pub. Date: Jun. 13, 2019

(65) Prior Publication Data
US 2020/0099963 A1     Mar. 26, 2020

(30) Foreign Application Priority Data

Dec. 6, 2017 (JP) ................................ 2017-233938

(51) Int. Cl.
*H04N 7/173* (2011.01)
*H04N 21/2343* (2011.01)
*H04N 21/2187* (2011.01)

(52) U.S. Cl.
CPC ..... *H04N 21/2343* (2013.01); *H04N 21/2187* (2013.01)

(58) Field of Classification Search
CPC ........... H04N 21/2343; H04N 21/2187; H04N 21/2146; H04N 21/214
See application file for complete search history.

(56) References Cited

U.S. PATENT DOCUMENTS

2014/0072270 A1* 3/2014 Goldberg ........... H04N 21/4312
                                                    386/223
2014/0082495 A1* 3/2014 Estes ..................... H04N 7/183
                                                    715/716

(Continued)

FOREIGN PATENT DOCUMENTS

CN          102577415 A       7/2012
CN          103262558 A       8/2013
(Continued)

OTHER PUBLICATIONS

Translation of International Search Report dated Jan. 22, 2019 and Written Opinion in corresponding application No. PCT/JP2018/044665; 7 pgs.

(Continued)

*Primary Examiner* — Kyu Chae
(74) *Attorney, Agent, or Firm* — Maier & Maier, PLLC (57) ABSTRACT

A server controlling a live distribution content that is distributed to a spectator terminal for a cruise service allowing a spectator to cruise around a plurality of live distribution contents is provided. The server includes a selection unit and a determination unit. The selection unit selects a plurality of candidates with respect to each selection opportunity for the spectator to select the live distribution content to be distributed to the spectator terminal. The determination unit determines the live distribution content to be distributed to the spectator terminal on the basis of information indicating an option that is selected by the spectator from a plurality of options. At least one of the plurality of candidates selected in at least one selection opportunity includes a common live distribution content regardless of the live distribution content that is viewed by the spectator at the time of selecting the plurality of candidates.

9 Claims, 8 Drawing Sheets

(56) References Cited

U.S. PATENT DOCUMENTS

2015/0121423 A1    4/2015  Phipps et al.
2017/0289589 A1   10/2017  Koumchatzky et al.

FOREIGN PATENT DOCUMENTS

JP    2012-142860 A    7/2012
JP    2016-010145 A    1/2016
JP    2016-123069 A    7/2016

OTHER PUBLICATIONS

Notice of Reasons for Refusal dated Feb. 27, 2018 in corresponding application No. 2017-233938, 8 pgs.
Decision to Grant a Patent dated May 8, 2018 in corresponding application No. 2017-233938, 5 pgs.
"Mentioning new function added in new interface "nicocas" of niconico for speeding up introduction site and enhancing image quality", Nov. 28, 2017, Gzbrain Inc., URL: https://www.famitsu.com/news/201711/28146962.html, 28 pgs.
"What is Nico Live Cruise", Jul. 16, 2017, Dwango Co., Ltd., URL: https://web.archive.org/web/20170716183422/http://live.nicovideo.jp/s/cruise, 4 pgs.
Office Action dated Oct. 12, 2020 in corresponding Chinese Application No. 201880062967.9; 9 pages.

* cited by examiner

SERVER AND PROGRAM

FIELD

The present invention relates to live distribution of a moving image in a moving image sharing system.

BACKGROUND

Recently, in a part of a moving image sharing system, a moving image that is captured by a user (hereinafter, simply referred to as a distributor) can be live-distributed to a plurality of spectators through the internet (also referred to as live broadcasting). In a live distribution content, on the nature thereof, it is difficult for the spectator to find a favorite content, for example, by keyword search or the like. For this reason, viewing behavior of the spectator with respect to the live distribution content is typically includes selective viewing of a live distribution content of a favorite distributor of the spectator, or zapping of a live distribution content that seems interesting with reference to the ranking of live distribution contents.

A service referred to as a "cruise" has been already operated as one way to enjoy the live distribution content. A cruise of the related art described in "What is Nico Live Cruise" [search on Nov. 5, 2017] URL:http://live.nicovideo.jp/s/cruise (the official name is Nico Live Cruise) is a service for the spectator to view (hereinafter, referred to as cruise around) a plurality of live distribution contents in sequence, for example, at a cycle of approximately tens of seconds, and the live distribution contents that the spectator cruises are determined by a service provider. The spectator while using the cruise (embarking) is capable of selecting whether to proceed to the next live distribution content or to stay on (disembark at) the current live distribution content.

The cruise has a merit that the spectator is capable of viewing various live distribution contents without actively searching for contents, and has a merit that the distributor has an opportunity to allow a large number of spectators to temporarily view a live distribution content of the distributor, and is capable of expecting new followers, for example, the acquisition of channel entrants.

In JP-A-2006-87046, it is disclosed that a cruise distribution device cruises around predetermined broadcasting station devices, sequentially receives streaming data from each of the broadcasting station devices, and distributes the streaming data to a reception device connected to a lower-level device [0009], and a specific distribution device to be connected and a connection order can be freely set by an operator of the cruise distribution device [0090]. In addition, in a second embodiment, it is disclosed that a cruise reproduction device includes a node device [0092], and an operator of the node device is capable of freely setting a cruise target broadcasting station, and a connection time and a connection order of the cruise target broadcasting station [0134].

In addition, in JP-A-2016-134859, a moving image distribution system is disclosed in which moving image contents are combined from various sources such as a real-time broadcasting program, and are distributed in broadcasting program scheduling that is suitable for the taste of a user. The moving image distribution system allows determining a plurality of broadcasting program candidates that are most suitable for the taste of the user, transmitting the plurality of broadcasting program candidates to a viewing terminal of the user, and performing selection from the broadcasting program candidates.

SUMMARY

In the cruise of the related art, a course thereof, that is, a content group that is distributed to the spectator is determined by the service provider, and the spectator has no decision right. This has a merit that the spectator is capable of viewing various live distribution contents without performing any operation, but has a possibility that the spectator feels pressure to view a live distribution content that is distributed regardless of the viewing taste or the intention of the spectator, and thus, refrains from using the service. In addition, the spectator dwindles by only presenting two options of "disembarking" or "not disembarking", unless considering halfway embarking. Therefore, the merit of the distributor of the live distribution content that is a destination decreases as the navigation progresses.

Therefore, for example, in a case where each of the spectators sequentially selects the next destination, the number of cruise users and an embarking continuation rate may increase. However, in a case where each of the spectators completely freely selects a cruise destination, the cruise destination branches repeatedly every time when the selection is performed, and thus, eventually, each of the spectators may view completely different live distribution content (the divergence of the destination).

Even in a case where there are only two options, the number of destinations of the cruise after the seventh selection is greater than 100, and an expectation value of the number of spectators selecting each of the live distribution contents is less than or equal to one hundredth of the initial number of spectators. Therefore, course control is complicated on a server side of the moving image sharing system, and it is difficult to predict how much server load is applied to the distribution of which live distribution content. In particular, in the case of preparing streaming for a cruise user unlike general streaming of the live distribution content for a spectator, the number of such additional streamings gradually increases. In addition, the expectation value of the number of spectators selecting the same live distribution content gradually decreases, and thus, the merit of the distributor also decreases.

An object of the invention is to suppress an increase in the number of streamings due to a divergence of a cruise destination while enabling a cruise user to select the destination.

According to one aspect of the invention, a server controlling a live distribution content that is distributed to a spectator terminal for a cruise service allowing a spectator to cruise around a plurality of live distribution contents is provided. The server includes a selection unit, a generation unit, a transmission unit, a reception unit, and a determination unit. The selection unit selects a plurality of candidates with respect to each selection opportunity for the spectator to select the live distribution content to be distributed to the spectator terminal. The generation unit generates first information for presenting a plurality of options that are respectively associated with the plurality of selected candidates to the spectator. The transmission unit transmits the first information to the spectator terminal. The reception unit receives second information indicating an option that is selected by the spectator from the plurality of options. The determination unit determines the live distribution content to be distributed to the spectator terminal on the basis of the second information. At least one of the plurality of candidates selected in at least one selection opportunity includes a common live distribution content regardless of the live distribution content that is viewed by the spectator at the time of selecting the plurality of candidates.

According to another aspect of the invention, a server controlling a live distribution content that is distributed to a spectator terminal for a cruise service allowing a spectator to cruise around a plurality of live distribution contents is provided. The server includes a selection unit, a generation unit, a transmission unit, a reception unit, a determination unit, and a determination unit. The selection unit selects a plurality of first candidates with respect to each selection opportunity for a spectator to select the live distribution content to be distributed to the spectator terminal. The generation unit generates first information for presenting a plurality of options that are respectively associated with the plurality of selected first candidates to the spectator. The transmission unit transmits the first information to the spectator terminal. The reception unit receives second information indicating an option that is selected by the spectator from the plurality of options. The determination unit determines the live distribution content to be distributed to the spectator terminal on the basis of the second information. The determination unit determines whether or not a predetermined condition is satisfied. In a case where it is determined that the predetermined condition is satisfied, (a) the selection unit selects at least one of common live distribution contents as second candidates regardless of the live distribution content that is viewed by the spectator when the predetermined condition is satisfied, and (b) the determination unit determines the live distribution content to be distributed to the spectator terminal from the second candidates. The total number of second candidates is less than the total number of live distribution contents that are viewed by the spectator when the predetermined condition is satisfied.

According to the invention, it is possible to suppress an increase in the number of streamings due to a divergence of a cruise destination while enabling a cruise user to select the destination.

DETAILED DESCRIPTION

Hereinafter, the embodiment will be described with reference to the drawings. Furthermore, hereinafter, identical or similar reference numerals will be applied to elements identical or similar to elements that have been described, and the repeated description will be basically omitted. For example, in a case where there are a plurality of identical or similar elements, there is a case where common reference numerals are used in order to describe the embodiment without distinguishing each of the elements, and there is also a case where branch numbers are used in addition to the common reference numerals in order to describe the embodiment by distinguishing each of the elements.

First Embodiment

Figure 1:
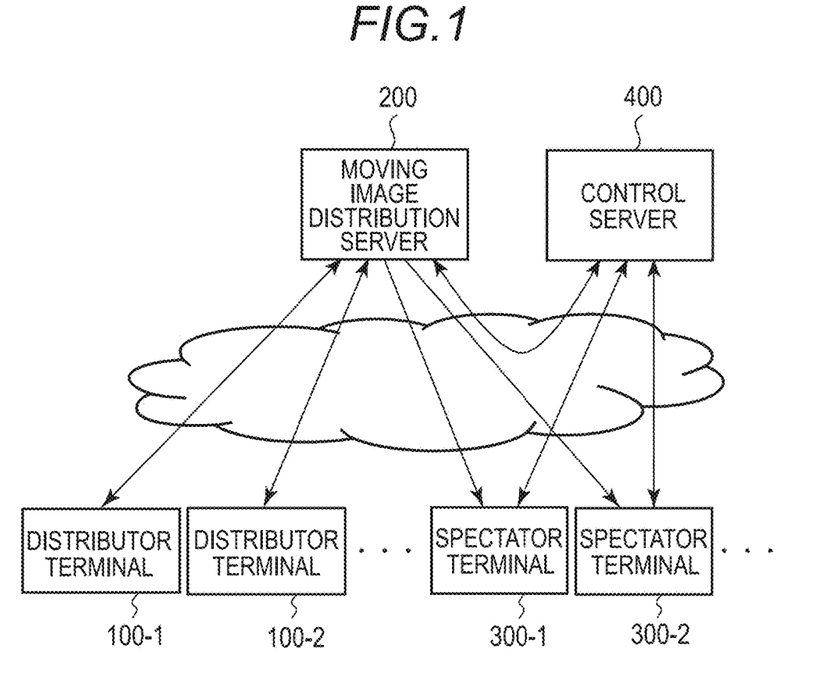
FIG. 1 is a block diagram illustrating an example of a live distribution system of a moving image including a control server according to a first embodiment.

A control server according to a first embodiment can be built in a live distribution system of a moving image, illustrated in FIG. 1. The live distribution system includes distributor terminals 100-1, 100-2, a moving image distribution server 200, spectator terminals 300-1, 300-2, and a control server 400.

In the example of FIG. 1, basically, the moving image distribution server 200 distributes a live distribution content that is sequentially transmitted from the distributor terminal 100 (in the following description, for convenience, referred to as a live broadcasting program, but the live distribution content is not limited thereto) to the spectator terminal 300. Here, a spectator is classified broadly into a viewer of a live broadcasting program that is selected by himself (a general spectator) and a viewer of a live broadcasting program that is determined by the control server 400 by using a cruise service (a cruise user). In the following description, for convenience, in principle, the spectator indicates the cruise user, and the spectator terminal 300 indicates a terminal that is used by the cruise user.

The moving image distribution server 200 is capable of providing the cruise service to the spectator terminal 300, in cooperation with the control server 400 described below. In the cruise service, a live broadcasting program that is distributed next to the spectator terminal 300 by the control server 400 (that is, a cruise destination) is determined, the moving image distribution server 200 distributes the determined live broadcasting program to the spectator terminal 300, for example, for approximately tens of seconds, and then, the control server 400 determines again the live broadcasting program that is distributed next to the spectator terminal 300. The control server 400 may allow the spectator to select the destination, in a part or all of opportunities for determining the cruise destination. Accordingly, the control server 400 is capable of allowing the cruise user to select the destination. Then, the control server 400 allows the destinations to converge by putting limitation described below on the selection of cruise destination candidates, and thus, is capable of suppressing the divergence of the destination, and of preventing an increase in the number of streamings used by the cruise.

The moving image distribution server 200 is connected to the distributor terminal 100, the spectator terminal 300, and the control server 400 through a network, and is capable of transmitting and receiving data with respect to the distributor terminal 100, the spectator terminal 300, and the control server 400. Similarly, the control server 400 is connected to the moving image distribution server 200 and the spectator terminal 300 through a network. The control server 400 transmits information for presenting options described below (first information) to the spectator terminal 300, receives information indicating an option that is selected by the spectator (second information) from the spectator terminal 300, or instructs the live broadcasting program to be distributed to the spectator terminal 300, that is, the cruise destination to the moving image distribution server 200.

Furthermore, the number of devices illustrated in FIG. 1 is merely an example. For example, the number of distributor terminals 100 and the number of spectator terminals 300 are changed from hour to hour, and thus, can be 0, or can be several hundreds or several thousands. In addition, a Web server or a comment distribution server that is not illustrated in FIG. 1 may be further provided, and the function thereof may be built in the moving image distribution server 200. In addition, the moving image distribution server 200 and the control server 400 may be integrated.

The distributor terminal 100, for example, can be an electronic device such as a computer connected to a moving image source such as a video camera, for example, a television set (including an internet television), a personal computer (PC), a mobile terminal (for example, a tablet, a smart phone, a laptop, a feature phone, a portable gaming console, a digital music player, an electronic reading device, and the like), a virtual reality (VR) terminal, an augmented reality (AR) terminal, and the like, but is not limited thereto. The distributor terminal 100 sequentially transmits encoded moving image data that is output from the moving image source to the moving image distribution server 200.

The moving image distribution server 200 receives the encoded moving image data that is sequentially transmitted from the distributor terminal 100. Then, the moving image distribution server 200 distributes the moving image data to the distributor terminal 100 and the spectator terminal 300 that distribute or view the moving image data. The spectator terminal 300 can be the same electronic device as the distributor terminal 100, but it is not necessary that the spectator terminal 300 is connected to the moving image source, unlike the distributor terminal 100. In addition, the moving image distribution server 200 distributes moving image data corresponding to a destination that is determined by the control server 400 with respect to the spectator terminal 300 of the cruise user.

The control server 400 controls the cruise destination. The control server 400 selects a plurality of candidates with respect to the live broadcasting program to be distributed next to the spectator terminal 300 from a plurality of currently distributable live broadcasting programs. Then, the control server 400 generates information for presenting a plurality of options that are respectively associated with the plurality of candidates to the spectator terminal 300, and transmits the information to the spectator terminal 300. The spectator terminal 300 returns information indicating which option is selected, and the control server 400 determines the live broadcasting program to be distributed next to the spectator terminal 300 on the basis of the information, and instructs the moving image distribution server 200 to distribute the live broadcasting program to the spectator terminal 300.

Furthermore, it is not necessary that the control server 400 defers the selection of all of the cruise destinations to the spectator, and the control server 400 may determine a part of the destination by a predetermined algorithm. As described below, in at least a part of selection opportunities for the spectator to select the live broadcasting program to be distributed next to the spectator terminal 300, the control server 400 puts limitation on the selection of the destination candidate in order to allow the candidates of the live broadcasting program to converge, and thus, is capable of suppressing an increase in the number of streamings due to the divergence of the cruise destination while enabling the cruise user to select the destination.

Hereinafter, the configuration and the operation of the control server 400 in FIG. 1 will be sequentially described by using the drawings.

The control server 400 is a computer, and includes a processor performing the selection of cruise destination candidates, the generation of the information for presenting the options, the determination of the cruise destination, and the like, and a memory temporarily storing a program that is executed by the processor for realizing such processing, data that is used by the processor, and the like.

Further, the control server 400 is capable of using a communication device for connection with respect to a network. The communication device may be built in the control server 400, or may be externally attached to the control server 400.

The communication device communicates with the moving image distribution server 200 and the spectator terminal 300 through a network. For example, the communication device receives the information of the currently distributable live broadcasting program, and the like, instructs the moving image distribution server 200 in the next destination of the cruise, transmits the information for presenting the options to the spectator terminal 300, or receives the information indicating the option that is selected by the spectator from the spectator terminal 300.

Figure 2:
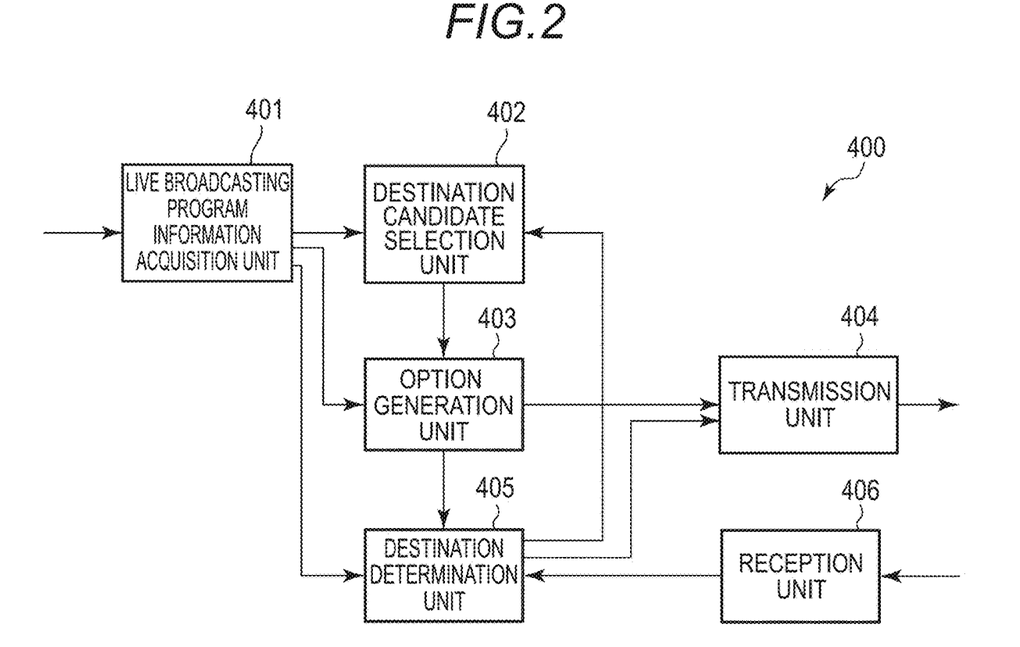
FIG. 2 is a block diagram illustrating the control server according to the first embodiment.

Next, a configuration example of the control server 400 will be continuously described by using FIG. 2. The control server 400 of FIG. 2 includes a live broadcasting program information acquisition unit 401, a destination candidate selection unit 402, an option generation unit 403, a transmission unit 404, a reception unit 406, and a destination determination unit 405.

The live broadcasting program information acquisition unit 401 acquires the information of the live broadcasting program that is capable of being currently distributed, that is, capable of being selected as the cruise destination. The live broadcasting program information acquisition unit 401, for example, may receive the information of the live broadcasting program from the moving image distribution server 200 through a network. The live broadcasting program information acquisition unit 401 may be the communication device described above, or may be an interface with respect to the communication device.

Examples of the information of the live broadcasting program are capable of including the live broadcasting program and/or information for identifying a distributor thereof, information indicating a time frame of the live broadcasting program, metadata applied to the live broadcasting program (for example, a moving image tag (a keyword), a sponsor name, and a broadcasting program category), a distributor comment, a descriptive text, attribute information of the live broadcasting program and/or the distributor, the number of spectators and/or the number of comments of the live broadcasting program, thumbnail image data of the live broadcasting program, moving image data of the live broadcasting program, a comment posted on the live broadcasting program, and the like.

The live broadcasting program information acquisition unit 401 sends the information of the live broadcasting program to the destination candidate selection unit 402, the option generation unit 403, and the destination determination unit 405. Furthermore, the information of the live broadcasting program, for example, may be stored in a storage unit (not illustrated), and may be suitably referred to by the destination candidate selection unit 402, the option generation unit 403, and the destination determination unit 405. In addition, in a case where the control server 400 is built in the moving image distribution server 200, the live broadcasting program information acquisition unit 401 can be unnecessary.

The destination candidate selection unit 402 receives the information of the currently distributable live broadcasting program from the live broadcasting program information acquisition unit 401. The destination candidate selection unit 402 selects the plurality of candidates with respect to each of the selection opportunities for the spectator to select the cruise destination. The destination candidate selection unit 402 notifies the plurality of selected candidates to the option generation unit 403. The destination candidate selection unit 402 may be the processor and the memory described above.

The destination candidate selection unit 402, basically, may select the plurality of candidates with any algorithm. For example, the destination candidate selection unit 402 may select the plurality of candidates randomly, or may change the ease of selection in accordance with elements included in the information of the live broadcasting program, for example, the attribute of the live broadcasting program and/or the distributor, the metadata applied to the live broadcasting program, the number of spectators and/or the number of comments of the live broadcasting program, and the like. However, in at least apart of the selection opportunities, the destination candidate selection unit 402 puts limitation on the candidate that is selected as described below, and thus, is capable of suppressing an increase in the number of streamings due to the divergence of the cruise destination.

The option generation unit 403 is notified of the plurality of candidates that are selected with respect to each of the selection opportunities from the destination candidate selection unit 402. The option generation unit 403 generates the information for presenting the plurality of options that are respectively associated with the plurality of candidates to the spectator. In order to generate such information, the option generation unit 403 may use the information of the live broadcasting program from the live broadcasting program information acquisition unit 401. The option generation unit 403 sends the generated information to the transmission unit 404. The option generation unit 403 may be the processor and the memory described above.

The information that is generated by the option generation unit 403, for example, may be data itself of the option to be displayed on the spectator terminal 300 or data to be the base thereof, or may be control data for controlling the spectator terminal 300 such that the spectator terminal 300 displays the option.

Furthermore, in the same live broadcasting program, it is not necessary that an option that is displayed on a certain spectator terminal 300 is identical to an option that is displayed on another spectator terminal 300. For example, the option is suitably designed in accordance with the attribute of the spectator, and thus, it is possible to make the spectator interested in the next destination, and to motivate the spectator to continuously use the cruise. However, individually generating the option in a spectator unit has a high server load, and thus, the option may be managed for each of the live broadcasting programs viewed by the spectator currently (for example, at the time of selecting the plurality of candidates). That is, options that are associated with a live broadcasting program C may be applied to both of a spectator who views a live broadcasting program A and a spectator who views a live broadcasting program B, and the options may be different from each other. It is possible to assume that spectators who view the same live broadcasting program have viewing behavior similar to each other to a certain extent, and thus, there is a possibility that the options in which the spectators are interested are similar to each other. Here, the different options can be different texts or images that are displayed on the spectator terminal 300.

In each of the selection opportunities, the transmission unit 404 receives the information for presenting the plurality of options to the spectator from the option generation unit 403. The transmission unit 404 transmits the information to the spectator terminal 300 through a network. The transmission unit 404 may be the communication device described above, or may be the interface with respect to the communication device.

In addition, the transmission unit 404 receives the information indicating the cruise destination, for example, identification information of the live broadcasting program as the destination, a URL, and the like from the destination determination unit 405, and transmits such information to the moving image distribution server 200 through a network.

The reception unit 406 receives the information indicating the option that is selected by the spectator from the spectator terminal 300 through a network. The information corresponds to a response from the spectator with respect to the information that is transmitted by the transmission unit 404. That is, the received information indicates the option that is selected by the spectator from the plurality of options presented to the spectator, on the basis of the information that is transmitted by the transmission unit 404. The reception unit 406 sends the received information to the destination determination unit 405. The reception unit 406 may be the communication device described above, or may be the interface with respect to the communication device.

The destination determination unit 405 receives the information indicating the option that is selected by the spectator from the reception unit 406, and determines the cruise destination for each of the spectators, on the basis of the information. The destination determination unit 405 sends information indicating the determined destination to the transmission unit 404. The destination determination unit 405 may be the processor and the memory described above.

For example, the destination determination unit 405 may determine the destinations of each of the spectators as a live broadcasting program associated with the option that is selected by the spectator. A destination of a spectator who does not select any option may be arbitrarily determined, and for example, may be a live broadcasting program associated with an option that is selected by the most spectators.

In addition, an option that is least selected by the spectators may be ignored from the viewpoint of suppressing an increase in the number of streamings. The destination of the spectator who selects such an option may be determined as with the destination of the spectator who does not select any option. Whether or not the number selected by the spectators is extremely small, for example, may be determined by comparing the number, or a ratio of the selection of the option in all of the options, with a threshold value.

Further, in a case where the number of options is less than the upper limit number of the destinations, for example, in a case where there are a maximum of two destinations even though three options are presented, the destination determination unit 405 may extract the options to the upper limit number in descending order of the number selected by the spectators, and may determine a live broadcasting program associated with the extracted option, as the destination. The destination of the spectator who does not select the extracted option may be determined as with the destination of the spectator who does not select any option.

Hereinafter, the details of the operation of the destination candidate selection unit 402 will be described by using FIG. 3 to FIG. 7.

Figure 3:
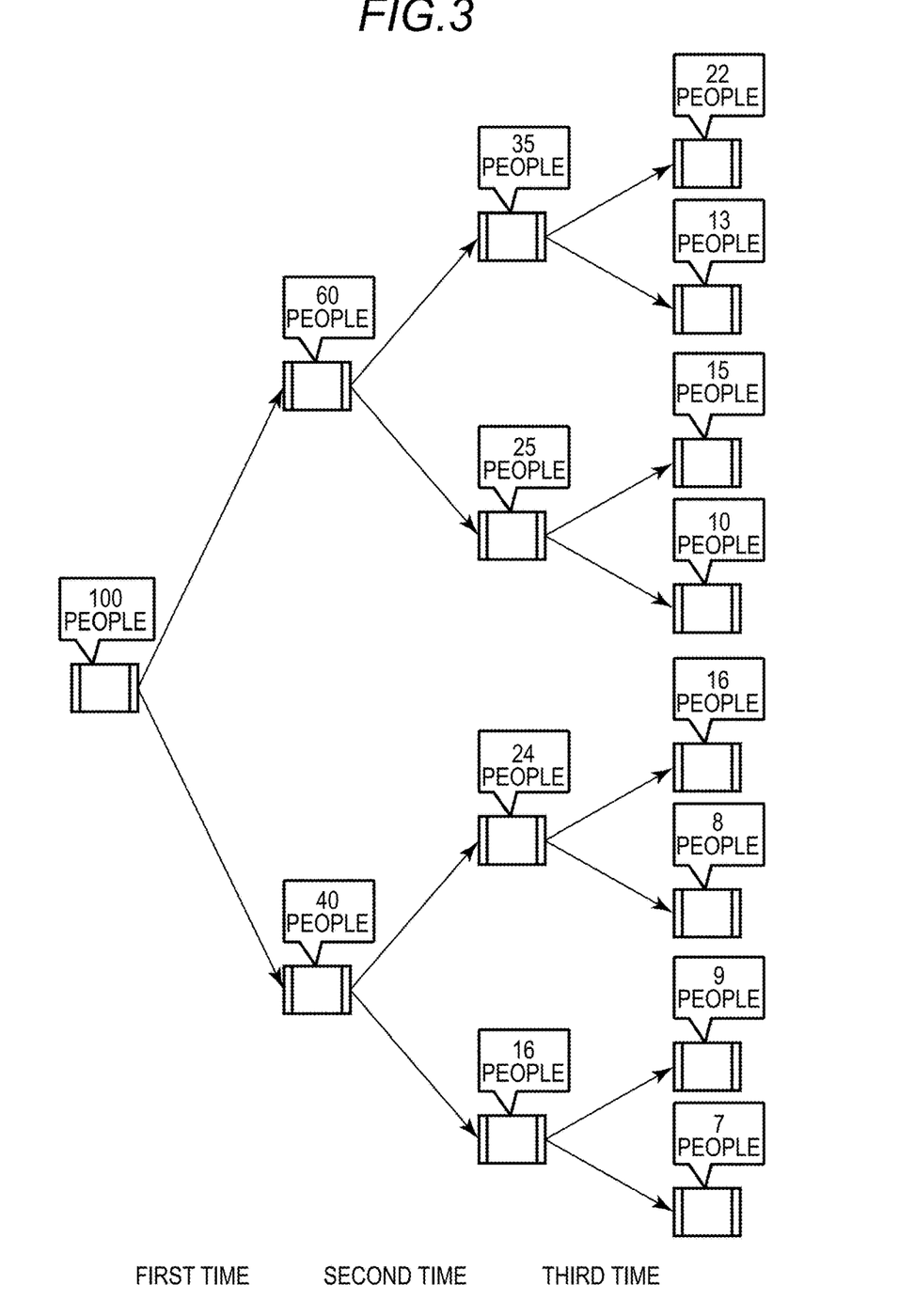
FIG. 3 is an explanatory diagram of a problem of not putting limitation on the selection of cruise destination candidates.

It is assumed that destination candidate selection unit 402 selects a candidate without putting limitation described below on all of the selection opportunities, and the candidate does not overlap between visit destinations of the cruise at that time (at the time of selecting the plurality of candidates) (that is, a live distribution content that is viewed by the spectator at that time). In this case, the cruise destination exponentially increases, and diverges as illustrated in FIG. 3. That is, the cruise destination is doubled at each of the selection opportunities, and simultaneously, the number of spectators per a destination decreases by half. Then, the number of destinations diverges into 8 after the third selection opportunity, and each of the spectators becomes approximately ⅛ of the original.

Figure 4:
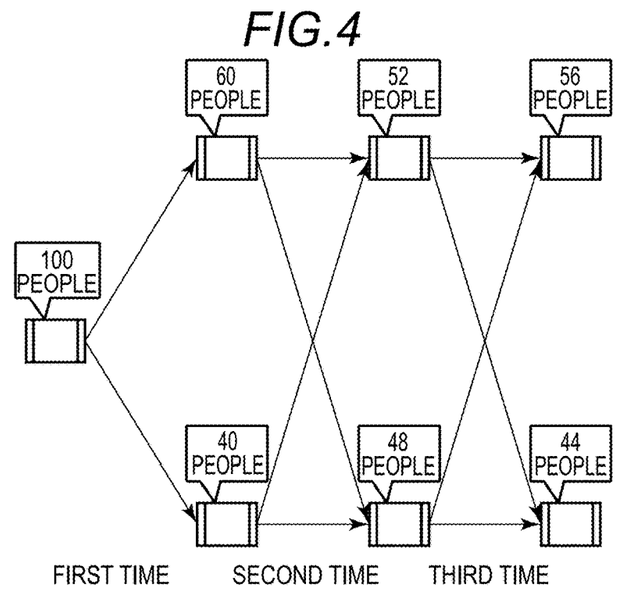
FIG. 4 is a conceptual diagram of an example of cruise destination control of the control server of FIG. 2.

Next, it is assumed that, in all of the selection opportunities, the destination candidate selection unit 402 selects a common live broadcasting program as the candidate regardless of the visit destination of the cruise at that time. In this case, the cruise destination does not diverge as illustrated in FIG. 4. That is, even in a case where there are many selection opportunities, destinations to which the cruise is capable of visiting next from each of the visit destinations are the same, and thus, it is possible to suppress the number of streamings to be less than or equal to a constant number (is identical to the number of options to be presented to the spectators in each of the visit destinations, and is two in the example of FIG. 4) at all times.

Accordingly, it is possible to prevent an increase in the number of streamings due to the divergence of the cruise destination while giving the spectator an impression that the cruise destination is freely selected. That is, the course control of the control server 400 is not complicated, and the live broadcasting program that can be the cruise destination is limited, compared to the example of FIG. 3, and thus, it is possible to predict how much server load is applied to the distribution of which live broadcasting program to a certain extent. In addition, even in a case where there are many selection opportunities, the number of spectators per a destination is maintained, and thus, the merit of the distributor as described above does not decrease.

Figure 5:
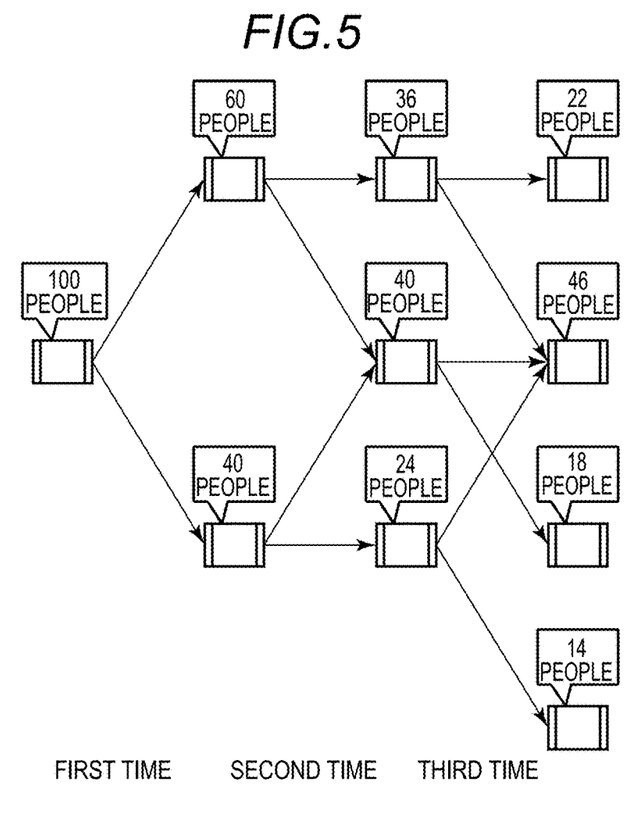
FIG. 5 is a conceptual diagram of another example of the cruise destination control of the control server of FIG. 2.

Furthermore, the limitation that can be put on the selection of the candidates by the destination candidate selection unit 402 is not limited to the description of FIG. 4. For example, in all of the selection opportunities, the destination candidate selection unit 402 may select the common live broadcasting program as apart of the candidate regardless of the visit destination of the cruise at that time. Specifically, one of the destinations to which the cruise is capable of visiting next from each of the visit destinations may be commonalized. In this case, as illustrated in FIG. 5, the cruise destination increases by one at each of the selection opportunities, and the spectator visiting towards each of the destinations decreases. However, it is possible to suppress an increase rate of the cruise destination and a decrease rate the number of spectators per a destination, compared to the example of FIG. 3.

Accordingly, it is possible to suppress an increase in the number of streamings due to the divergence of the cruise destination while giving the spectator an impression that the cruise destination is freely selected. That is, the course control of the control server 400 is not complicated, and the live broadcasting program that can be the cruise destination is limited, compared to the example of FIG. 3, and thus, it is possible to predict how much server load is applied to the distribution of which live broadcasting program to a certain extent.

Further, in the example of FIG. 5, for example, a live broadcasting program that is not common to other visit destinations can be selected as the candidate. The destination candidate selection unit 402 may select such a candidate, for example, in a manner that depends on the information of the visit destination. Accordingly, it is possible to increase a possibility that the spectators in each of the visit destinations encounter a live broadcasting program that is matched with a viewing taste of the spectator, compared to the example of FIG. 4.

Alternatively, in all of the selection opportunities, it may not be necessary that the destination candidate selection unit 402 puts limitation on the selection of the candidates. That is, in at least one selection opportunity, the destination candidate selection unit 402 may put the limitation described in FIG. 4 or FIG. 5 on the selection of the candidates.

Figure 6:
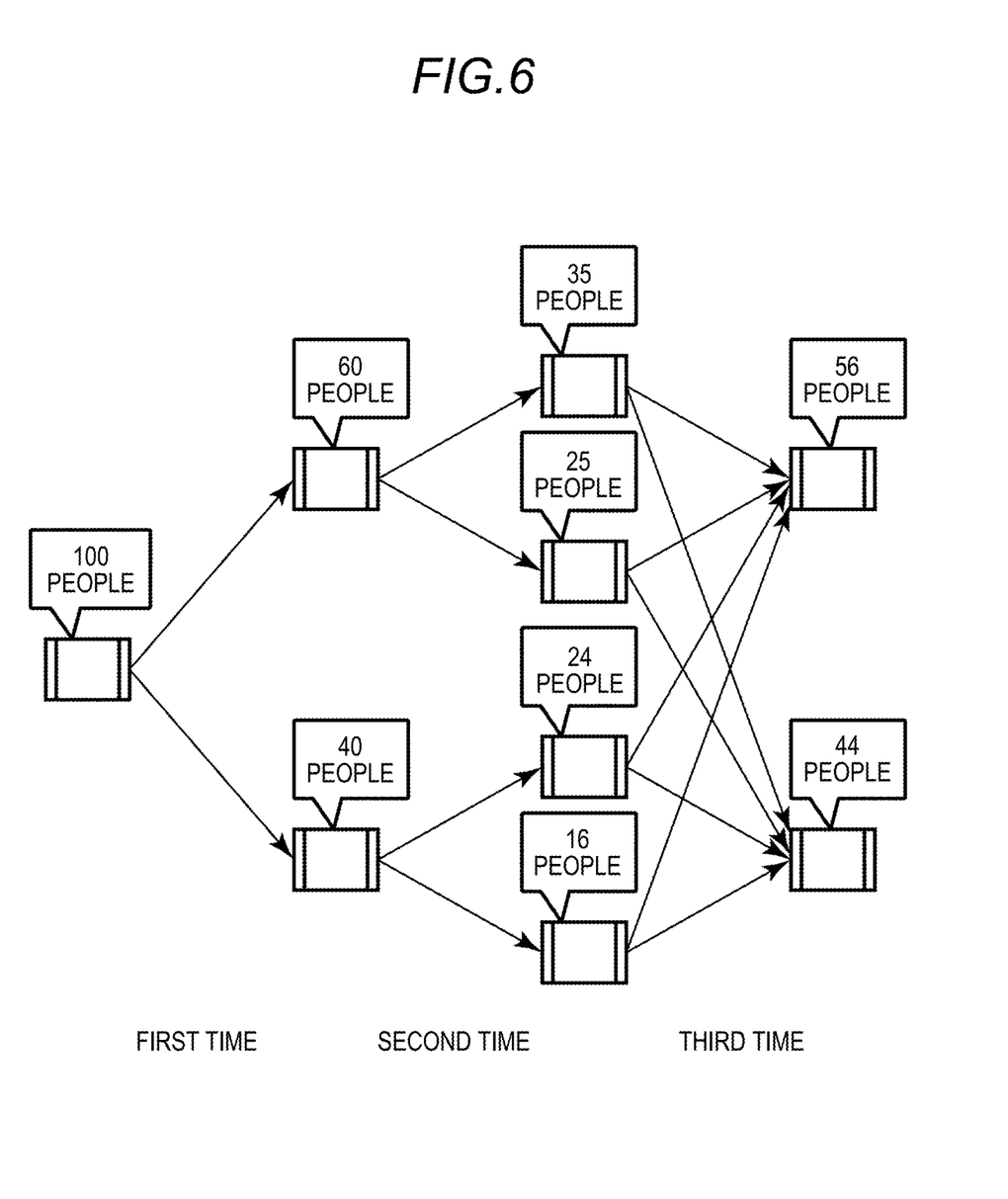
FIG. 6 is a conceptual diagram of another example of the cruise destination control of the control server of FIG. 2.

For example, in the first selection opportunity or the second selection opportunity, the destination candidate selection unit 402 may not put limitation on the selection of the candidates, and in the third selection opportunity, the destination candidate selection unit 402 may select (two) common live broadcasting programs regardless of the live distribution content that is viewed by the spectator at the time of selecting the candidates. In this case, as illustrated in FIG. 6, the cruise destination is doubled, and simultaneously, the number of spectators per a destination decreases by half, at each of the selection opportunities, while the limitation is not put on the selection of the candidates, as with the example of FIG. 3. However, in the third selection opportunity, the limitation is put on the selection of the candidates, and thus, the number of destinations is forcibly narrowed down to a maximum of 2, and the number of spectators per a broadcasting program also returns to a level after the first selection opportunity.

Figure 7:
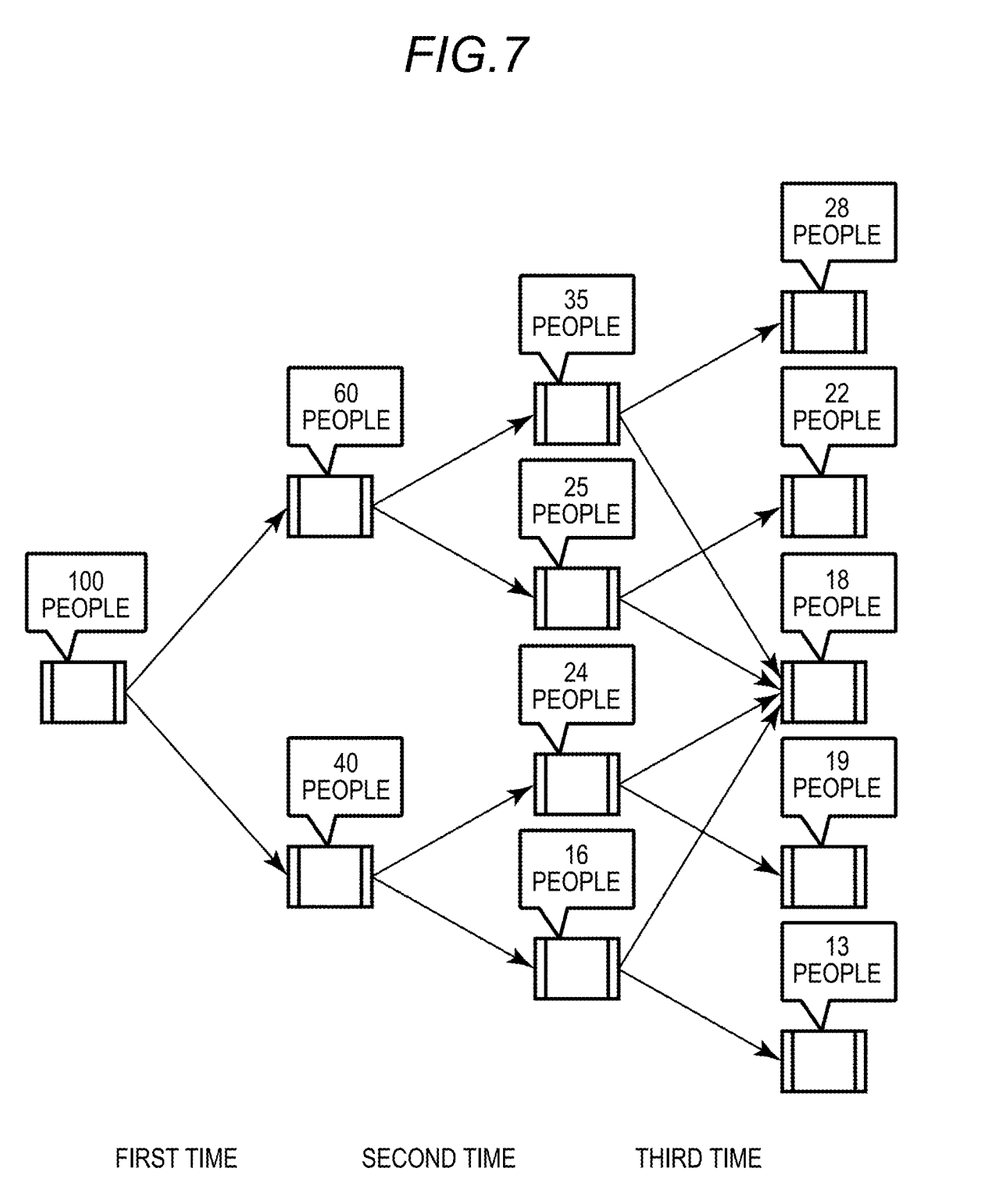
FIG. 7 is a conceptual diagram of another example of the cruise destination control of the control server of FIG. 2.

Alternatively, in the first selection opportunity and the second selection opportunity, the destination candidate selection unit 402 may not put limitation on the selection of the candidates, and in the third selection opportunity, the destination candidate selection unit 402 may select (one) common live broadcasting program as a part of the candidates regardless of the live broadcasting program that is viewed by the spectator at the time of selecting the candidates. In this case, as illustrated in FIG. 7, the cruise destination is doubled, and simultaneously, the number of spectators per a destination decreases by half, at each of the selection opportunities, while the limitation is not put on the selection of the candidates, as with the example of FIG. 3. However, in the third selection opportunity, the limitation is put on the selection of the candidates, and thus, the increase rate of the cruise destination and the decrease rate of the number of spectators per a destination slow down.

As described above, the destination candidate selection unit 402 puts the limitation on the selection of the candidates, and thus, it is possible to suppress the number of streamings to be less than or equal to a constant number, or to allow the increase rate of the cruise destination and the decrease rate of the number of spectators per a destination to slow down. In addition, the destination candidate selection unit 402 may put such limitation at all times or on and off.

Furthermore, in the examples of FIG. 4 to FIG. 7, the number of options to be presented to the spectator is 2, but may be greater than or equal to 3. In addition, in this example, the initial destination of the cruise is common in all of the spectators, but the spectator may select the destination from the start. Further, it is not necessary to defer the determination of the destination to the spectator at each time. For example, the destination determination unit 405 may automatically determine the destination one or a plurality of times after one selection opportunity is given until the next selection opportunity is given. As described above, a frequency of giving the selection opportunity decreases, and thus, it is sufficient that the spectator does not frequently (for example, every tens of seconds) select the option.

Figure 8:
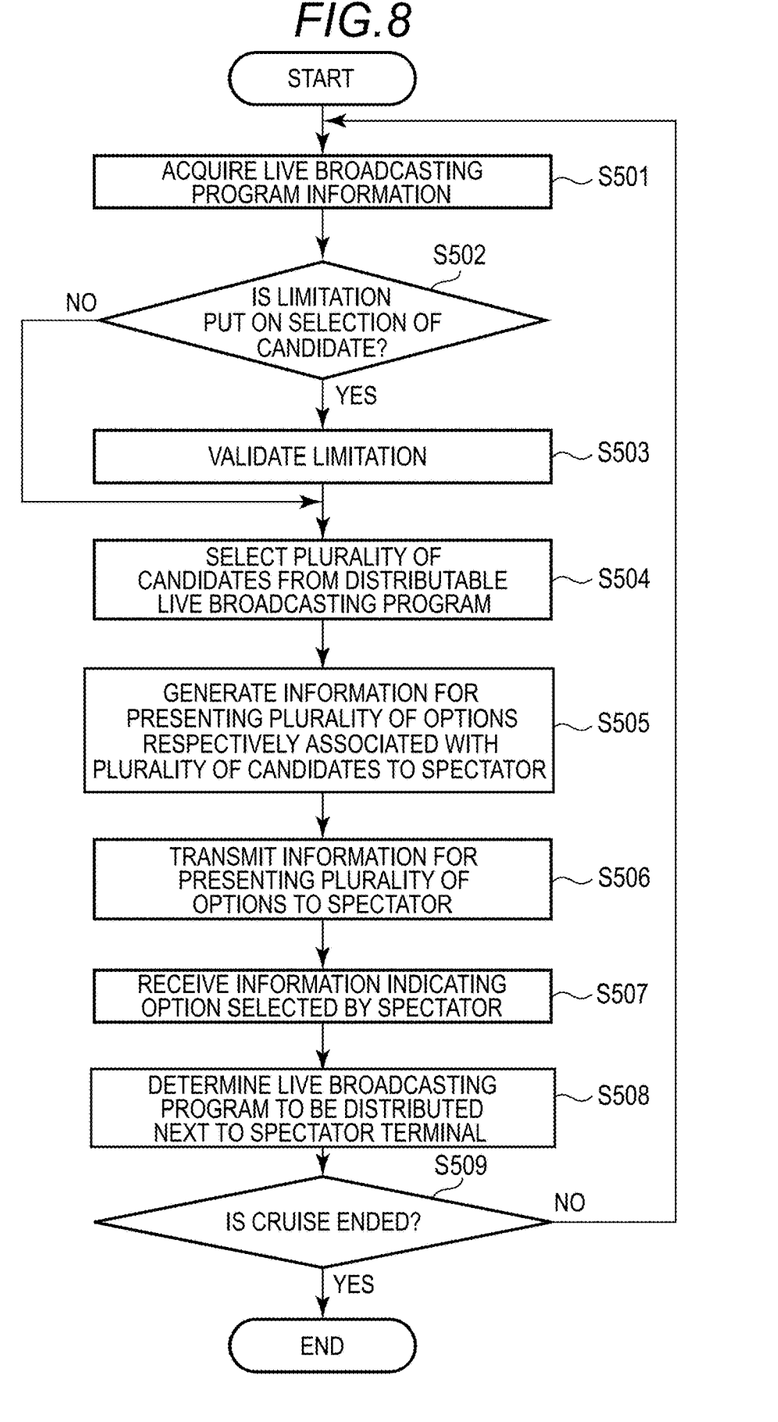
FIG. 8 is a flowchart illustrating the operation of the control server of FIG. 2.

Next, an operation example of the control server 400 will be described by using FIG. 8. The control server 400 repeats Step S501 to Step S508 described below with respect to each of the selection opportunities for the spectator to select the cruise destination until the cruise is ended.

First, in Step S501, the live broadcasting program information acquisition unit 401 acquires the information of the live broadcasting program that can be currently distributed by the moving image distribution server 200, and the processing proceeds to Step S502. Furthermore, as described above, Step S501 to Step S508 are repeated until the cruise is ended, and in a case where it is not necessary to update the information of the live broadcasting program acquired at the time of executing Step S501 in the past, the execution of Step S501 may be skipped.

In Step S502, it is determined whether or not limitation is put on the selection of the candidates of the destination candidate selection unit 402. For example, the limitation may be put at each time, may be put periodically or randomly, or may be put when a predetermined condition is satisfied (for example, when the number of cumulative selection times, the number of streaming, and the like reach a predetermined number). In the case of putting the limitation, the processing proceeds to Step S503, and in the case of not putting the limitation, the processing proceeds to Step S504.

In Step S503, the destination candidate selection unit 402 validates the limitation on the selection of the candidates. The destination candidate selection unit 402, for example, may rewrite a flag of controlling the validation/invalidation of the limitation. After Step S503, the processing proceeds to Step S504.

In Step S504, the destination candidate selection unit 402 selects the plurality of candidates with respect to the cruise destination from the currently distributable live broadcasting program. Here, the destination candidate selection unit 402 may select the plurality of candidates on the basis of the information of the live broadcasting program that is acquired in Step S501.

In general, the destination candidate selection unit 402 selects the plurality of candidates individually for each of the current visit destinations of the cruise, that is, for each of the live broadcasting programs that are currently viewed by the spectators. However, in a case where the limitation is validated in Step S503, the destination candidate selection unit 402 selects at least a partially common candidate regardless of the current visit destination of the cruise.

The option generation unit 403 generates the information for presenting the plurality of options that are respectively associated with the plurality of selected candidates in Step S504 to the spectator (Step S505). Here, the option generation unit 403 may generate the information for presenting the options to the spectator, on the basis of the information of the live broadcasting program that is acquired in Step S501.

Furthermore, in a case where the limitation is validated in Step S503, a candidate that is selected with respect to a certain visit destination and a candidate that is selected with respect to the other visit destination overlap with each other, or are coincident with each other. Even in such a case, the option generation unit 403 may change the options corresponding to the same candidate between the visit destinations.

For example, the option generation unit 403 may generate information for presenting options indicating similarities between the information of the visit destination and the information of the next destination candidate with respect to the spectators in each of the visit destinations. Accordingly, it is possible for the spectators in each of the visit destinations to feel that a destination similar to the current visit destination that is selected by the spectator is selected as the candidate. That is, it is possible to prevent the options separated from the option that is selected by the spectator from being abruptly presented, and thus, it is possible to suppress an increase in the number of streamings, or to maintain or decrease the number of streaming, without giving the spectator uncomfortable feeling.

The transmission unit 404 transmits the information that is generated in Step S505 to the spectator terminal 300 through a network (Step S506). The spectator terminal 300 receiving the information that is transmitted in Step S506 presents the plurality of options on the basis of the information. The spectator terminal 300 transmits the information indicating the option that is selected by the spectator to the control server 400 through a network. Then, the reception unit 406 receives the information (Step S507).

The destination determination unit 405 determines the next destination of the cruise on the basis of the information that is received in Step S507 (Step S508).

After Step S508 is ended, the control server 400 waits for the next selection opportunity until the cruise is ended (Step S509). In the next selection opportunity, the processing returns to Step S501.

As described above, in at least one selection opportunity for the spectator to select the live broadcasting program to be distributed to the spectator, the control server according to the first embodiment puts limitation on the selection of the candidates of the live broadcasting program. The limitation commonalizes at least a part of the plurality of candidates to be selected regardless of the live broadcasting program that is viewed by the spectator at the time of selecting the candidates. Accordingly, according to such a control server, it is possible to suppress an increase in the number of streamings, or to maintain or decrease the number of streaming, while giving the spectator an impression that the cruise destination is freely selected.

Second Embodiment

In at least one selection opportunity for the spectator to select the live broadcasting program to be distributed to the spectator, the control server according to the first embodiment described above puts limitation on the selection of the candidates of the live broadcasting program, and thus, an increase in the number of streamings is suppressed, or the number of streamings is maintained or decreased, while giving the spectator an impression that the cruise destination is freely selected.

On the other hand, in a case where the number of streamings used by the cruise increases over an allowable range or a case where there is such a concern, a control server according to a second embodiment to be described below forcibly narrows down the number of streamings, while basically allowing the spectator to freely select the cruise destination. Accordingly, it is possible to prevent the number of streamings from increasing over the allowable range, while giving the spectator an impression that the cruise destination is freely selected.

The control server according to second embodiment is partially similar to the control server 400 of FIG. 2. Hereinafter, differences between the control server according to second embodiment and the control server 400 will be mainly continuously described. An example of the control server according to this embodiment is illustrated in FIG. 9.

Figure 9:
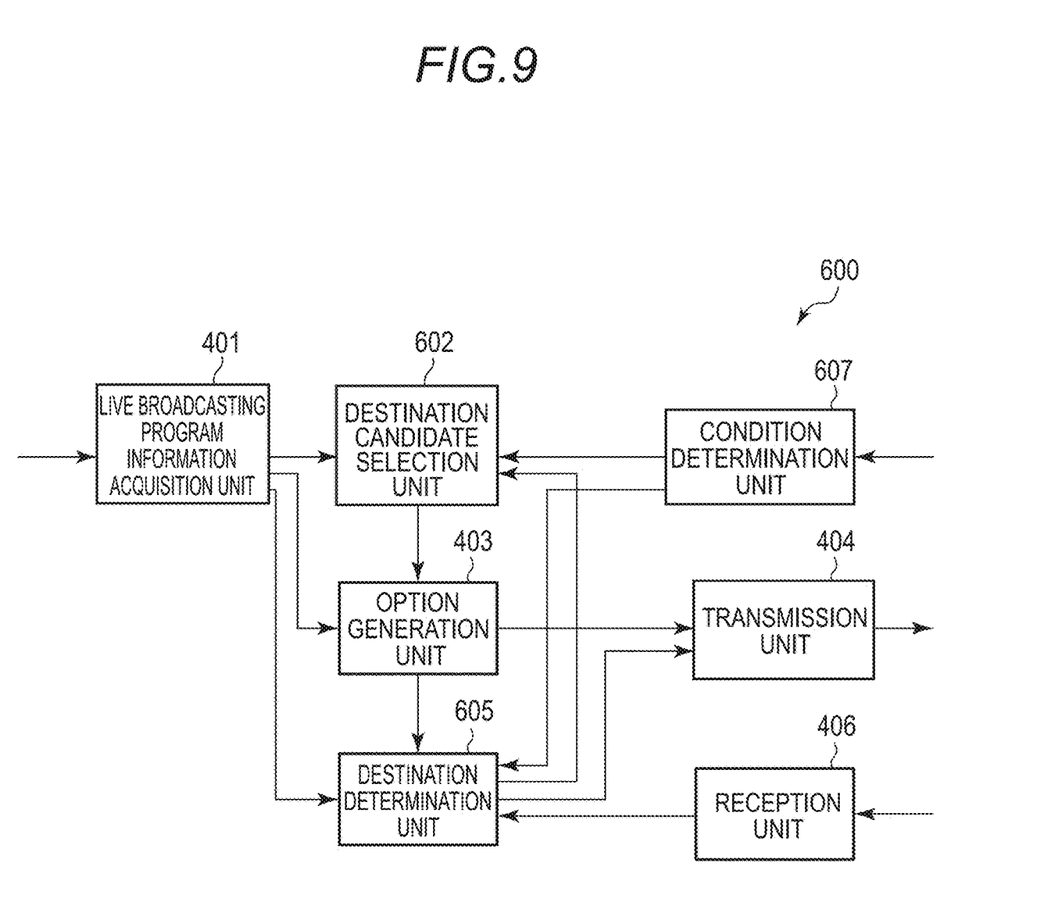
FIG. 9 is a block diagram illustrating a control server according to a second embodiment.

A control server 600 of FIG. 9 includes the live broadcasting program information acquisition unit 401, a destination candidate selection unit 602, the option generation unit 403, the transmission unit 404, the reception unit 406, a destination determination unit 605, and a condition determination unit 607.

The condition determination unit 607 determines whether or not a predetermined condition is satisfied. Here, the predetermined condition is defined in advance as a condition for determining whether it is a state in which the number of streamings used by the cruise increases over the allowable range, or it is a state in which there is the concern.

Specifically, the predetermined condition may indicate that the cumulative number of selection opportunities given to the spectator reaches a predetermined number of times. In a case where the spectator completely freely selects the cruise destination, the total number of cruise destinations exponentially increases with respect to the selection opportunity. Therefore, even in a case where the information of the number of streamings actually used by the cruise is not received from the moving image distribution server 200, it is possible to determine whether it is the state in which the number of streamings increases over the allowable range, or it is the state in which there is the concern, by checking the cumulative number of selection opportunities of the spectator who is highly correlated with the number of streamings.

Alternatively, the predetermined condition may indicate that the number of streamings used by the cruise reaches a predetermined number. The information of the number of streamings used by the cruise may be received from the moving image distribution server 200, or may be calculated on the basis of the cumulative number of selection opportunities described above, the output of the destination determination unit 605, and the like.

In a case where it is determined that the predetermined condition is satisfied, the condition determination unit 607 performs a notification with respect to the destination candidate selection unit 602 and the destination determination unit 605. The condition determination unit 607 may be the processor and the memory described above.

The destination candidate selection unit 602 is similar to the destination candidate selection unit 402 of FIG. 2, but is different from the destination candidate selection unit 402 in at least the following points. In a case where it is notified that the predetermined condition is satisfied from the condition determination unit 607, the destination candidate selection unit 602 selects at least one of common live distribution contents as the candidate regardless of the live broadcasting program that is viewed by the spectator at that time (when the predetermined condition is satisfied). The total number of candidates may be 1, or may be greater than or equal to 2, and the total number of candidates is less than the total number of current visit destinations of the cruise, that is, the total number of live broadcasting programs viewed by the spectator. Accordingly, it is possible to forcibly narrow down the number of streamings used by the cruise. The destination candidate selection unit 602 sends the selected candidate to the destination determination unit 605.

The destination determination unit 605 is similar to the destination determination unit 405 of FIG. 2, but is different from the destination determination unit 405 in at least the following points. In a case where it is notified that the predetermined condition is satisfied from the condition determination unit 607, the destination determination unit 605 determines the destination from the candidates selected by the destination candidate selection unit 602, regardless of the selection of the spectator of the cruise. For example, in a case where the total number of candidates selected by the destination candidate selection unit 602 is 1, the destination determination unit 405 may determine the next destination as the candidate, with respect to all of the spectators. On the other hand, in a case where the total number of candidates is greater than or equal to 2, the destination determination unit 405, for example, may determine any one of the candidates as the next destination of the cruise, for each of the current visit destinations of the cruise or for each of the spectators. The destination determination unit 405 may randomly determine the destination, or may determine the candidate similar to the visit destination, as the destination, for each of the current visit destinations of the cruise. In a case where the candidate similar to the current visit destination of the cruise is determined as the destination, the spectator is not capable of directly selecting the destination, but is induced to the destination similar to the visit destination that is selected by the spectator. Therefore, it is possible to forcibly narrow down the number of streamings without giving the spectator uncomfortable feeling.

Furthermore, as described above, when the predetermined condition is satisfied, the destination determination unit 605 determines the cruise destination without the selection of the spectator. Therefore, the option generation unit 403 does not generate the information for presenting the options, the transmission unit 404 does not transmit the information, and the reception unit 406 does not receive the information indicating the option that is selected by the spectator.

Next, an operation example of the control server 600 will be described by using FIG. 9. The control server 600 repeats Step S701 to Step S708 described below with respect to each of the selection opportunities for the spectator to select the cruise destination, until the cruise is ended.

Figure 10:
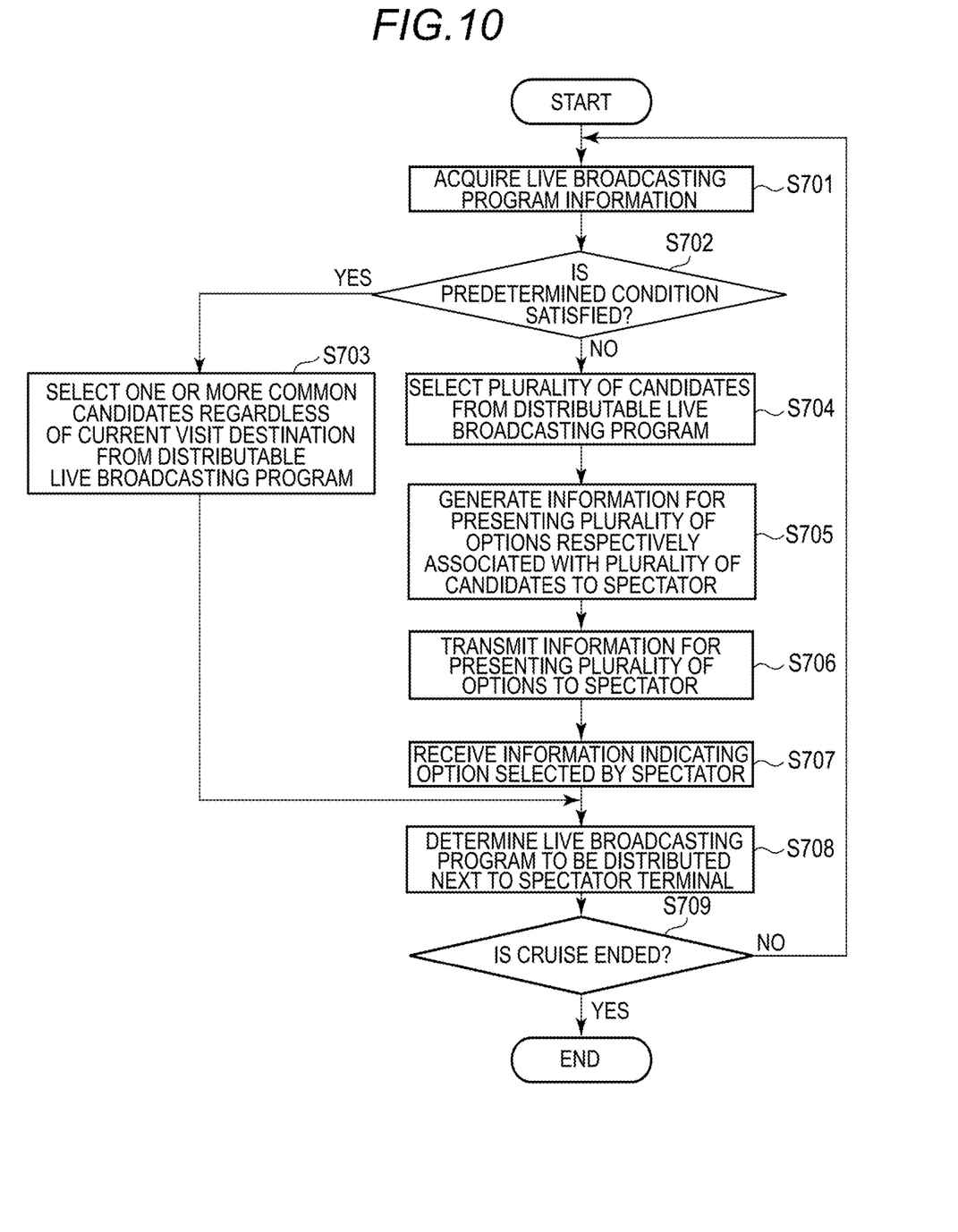
FIG. 10 is a flowchart illustrating the operation of the control server of FIG. 9.

First, in Step S701, the live broadcasting program information acquisition unit 401 acquires the information of the live broadcasting program that can be currently distributed by the moving image distribution server 200, and the processing proceeds to Step S702. Furthermore, as described above, Step S701 to Step S708 are repeated until the cruise is ended, and in a case where it is not necessary to update the information of the live broadcasting program acquired at the time of executing Step S701 in the past, the execution of Step S701 may be skipped.

In Step S702, the condition determination unit 607 determines whether or not the predetermined condition is satisfied. In a case where it is determined that the predetermined condition is satisfied, the processing proceeds to Step S703, and in a case where it is determined that the predetermined condition is not satisfied, the processing proceeds to Step S704.

In Step S703, the destination candidate selection unit 602 selects one or more common candidates from the currently distributable live broadcasting programs, regardless of the current visit destination of the cruise. Here, the destination candidate selection unit 602 may select one or more candidates on the basis of the information of the live broadcasting program that is acquired in Step S701. After Step S703, the processing proceeds to Step S708.

In Step S704, the destination candidate selection unit 602 selects the plurality of candidates with respect to the cruise destination from the currently distributable live broadcasting programs, with respect to each of the current visit destinations of the cruise. Here, the destination candidate selection unit 602 may select the plurality of candidates on the basis of the information of the live broadcasting program that is acquired in Step S701.

The option generation unit 403 generates the information for presenting the plurality of options that are respectively associated with the plurality of selected candidates in Step S704 to the spectator (Step S705). Here, the option generation unit 403 may generate the information for presenting the options to the spectator, on the basis of the information of the live broadcasting program that is acquired in Step S701.

The transmission unit 404 transmits the information that is generated in Step S705 to the spectator terminal 300 through a network (Step S706). The spectator terminal 300 receiving the information that is transmitted in Step S706 presents the plurality of options on the basis of the information. The spectator terminal 300 transmits the information indicating the option that is selected by the spectator to the control server 600 through a network. Then, the reception unit 406 receives the information (Step S707).

The destination determination unit 405 determines the next destination of the cruise (Step S708). Specifically, in a case where it is determined that the predetermined condition is satisfied in Step S702, the destination determination unit 405 determines the next destination of the cruise by a predetermined algorithm, from one or more candidates that are selected in Step S703. On the other hand, in a case where it is not determined that the predetermined condition is satisfied in Step S702, the destination determination unit 405 determines the next destination of the cruise on the basis of the information that is received in Step S707, from the plurality of candidates that are selected in Step S704.

After Step S708 is ended, the control server 600 waits for the next selection opportunity until the cruise is ended (Step S709). In the next selection opportunity, the processing returns to Step S701.

As described above, a case where it is determined that the predetermined condition is satisfied, the control server according to the second embodiment forcibly narrows down the number of streamings used by the cruise, while basically allowing the spectator to freely select the cruise destination. Specifically, the control server selects one or more (however, the number is less than the total number of current visit destinations of the cruise) common candidates regardless of the visit destination of the cruise, and determines the next destination of the cruise from the selected candidates, for each of the current visit destinations of the cruise or for each of the spectators, or by all of the spectators. Accordingly, according to such a control server, it is possible to prevent the number of streamings from increasing over the allowable range while giving the spectator an impression that the cruise destination is freely selected.

The embodiments described above are merely a specific example for facilitating the understanding of the concept of the present invention, and are not intended to limit the scope of the invention. In the embodiments, constituents can be variously added, deleted, or converted within a range not departing from the gist of the invention.

Various function units described in the embodiments described above may be realized by using a circuit. The circuit may be a dedicated circuit that realizes a specific function, or may be a general-purpose circuit such as a processor.

At least a part of the processing of the embodiments described above can be realized by using a general-purpose computer as basic hardware. A program for realizing the processing described above may be provided by being stored in a computer-readable recording medium. The program is stored in a recording medium as a file in an installable format or a file in an executable format. The recording medium is a magnetic disk, an optical disk (a CD-ROM, a CD-R, a DVD, and the like), a magnetooptic disk (an MO and the like), a semiconductor memory, and the like. The recording medium may be any recording medium insofar as the recording medium is capable of storing a program, and is capable of being read by a computer. In addition, the program for realizing the processing described above may be stored on a computer (a server) connected to a network such as the internet, and may be downloaded to a computer (a client) through a network.

The invention claimed is:

1. A server controlling a live distribution content that is distributed to a spectator terminal in order for a cruise service allowing a spectator to cruise around a plurality of live distribution contents,
   wherein a plurality of candidates are selected with respect to each selection opportunity for the spectator to select the live distribution content to be distributed to the spectator terminal;
   wherein a first information is generated for presenting a plurality of options that are respectively associated with the plurality of selected candidates to the spectator;
   wherein the first information is transmitted to the spectator terminal;
   wherein a second information indicating an option that is selected by the spectator from the plurality of options is received by the server; and
   wherein the live distribution content to be distributed to the spectator terminal is determined on the basis of the second information,
   wherein the plurality of candidates are selected such that a second live distribution content and a third live distribution content different from the second live distribution content are included in the spectator terminal to which a first live distribution content is distributed, and
   wherein the plurality of candidates are selected such that the second live distribution content and a fifth live distribution content different from the second live distribution content are included in the spectator terminal to which a fourth live distribution content different from the first live distribution content is distributed, at the time of selecting the plurality of candidates in a first selection opportunity that is one of the selection opportunities.

2. The server according to claim 1,
   wherein the third live distribution content and the fifth live distribution content are the same live distribution content.

3. The server according to claim 1,
   wherein at least one of the plurality of candidates selected in each of the selection opportunities is the common live distribution content regardless of the live distribution content that is viewed by the spectator at the time of selecting the plurality of candidates.

4. The server according to claim 1,
wherein each of the plurality of candidates selected in each of the selection opportunities is the common live distribution content regardless of the live distribution content that is viewed by the spectator at the time of selecting the plurality of candidates.

5. A non-transitory computer readable storage medium storing a program allowing a computer to control a live distribution content that is distributed to a spectator terminal in order for a cruise service allowing a spectator to cruise around a plurality of live distribution contents, the computer functioning to:
select a plurality of candidates with respect to each selection opportunity for the spectator to select the live distribution content to be distributed to the spectator terminal;
generate a first information for presenting a plurality of options that are respectively associated with the plurality of selected candidates to the spectator;
transmit the first information to the spectator terminal;
receive a second information indicating an option that is selected by the spectator from the plurality of options; and
determine the live distribution content to be distributed to the spectator terminal on the basis of the second information,
wherein the plurality of candidates are selected such that a second live distribution content and a third live distribution content different from the second live distribution content are included in the spectator terminal to which a first live distribution content is distributed, and
wherein the plurality of candidates are selected such that the second live distribution content and a fifth live distribution content different from the second live distribution content are included in the spectator terminal to which a fourth live distribution content different from the first live distribution content is distributed, at the time of selecting the plurality of candidates in a first selection opportunity that is one of the selection opportunities.

6. A server controlling a live distribution content that is distributed to a spectator terminal in order for a cruise service allowing a spectator to cruise around a plurality of live distribution contents,
wherein the server determines whether or not a predetermined condition is satisfied;
wherein a plurality of first candidates are selected with respect to each selection opportunity for the spectator to select the live distribution content to be distributed to the spectator terminal in a case where it is determined that the predetermined condition is not satisfied;
wherein a first information is generated for presenting a plurality of options that are respectively associated with the plurality of selected first candidates to the spectator in a case where it is determined that the predetermined condition is not satisfied;
wherein the first information is transmitted to the spectator terminal in a case where it is determined that the predetermined condition is not satisfied;
wherein a second information indicating an option that is selected by the spectator from the plurality of options in a case where it is determined that the predetermined condition is not satisfied is received by the server; and
wherein the live distribution content to be distributed to the spectator terminal is determined on the basis of the second information in a case where it is determined that the predetermined condition is not satisfied,
wherein in a case where it is determined that the predetermined condition is satisfied, (a) the selection unit selects at least one of common live distribution contents as second candidates regardless of the live distribution content that is viewed by the spectator when the predetermined condition is satisfied, and (b) the determination unit determines the live distribution content to be distributed to the spectator terminal from the second candidates, and
wherein the total number of second candidates is less than the total number of live distribution contents that are viewed by the spectator when the predetermined condition is satisfied.

7. The server according to claim 6,
wherein the predetermined condition is that the cumulative number of selection opportunities applied to the spectator reaches a predetermined number of times.

8. The server according to claim 6,
wherein the predetermined condition is that the number of streamings used by the cruise service reaches a predetermined number.

9. A non-transitory computer readable storage medium storing a program allowing a computer to control a live distribution content that is distributed to a spectator terminal in order for a cruise service for allowing a spectator to cruise around a plurality of live distribution contents, the computer functioning to:
determine whether or not a predetermined condition is satisfied;
select a plurality of first candidates with respect to each selection opportunity for the spectator to select the live distribution content to be distributed to the spectator terminal in a case where it is determined that the predetermined condition is not satisfied;
generate a first information for presenting a plurality of options that are respectively associated with the plurality of selected first candidates to the spectator in a case where it is determined that the predetermined condition is not satisfied;
transmit the first information to the spectator terminal in a case where it is determined that the predetermined condition is not satisfied;
receive a second information indicating an option that is selected by the spectator from the plurality of options in a case where it is determined that the predetermined condition is not satisfied; and
determine the live distribution content to be distributed to the spectator terminal on the basis of the second information in a case where it is determined that the predetermined condition is not satisfied,
wherein in a case where it is determined that the predetermined condition is satisfied, (a) the means of selecting the plurality of first candidates selects at least one of common live distribution contents as second candidates regardless of the live distribution content that is viewed by the spectator when the predetermined condition is satisfied, (b) the means of determining the live distribution content determines the live distribution content to be distributed to the spectator terminal from the second candidates, and
wherein the total number of second candidates is less than the total number of live distribution contents that are viewed by the spectator when the predetermined condition is satisfied.

* * * * *